(12) United States Patent
Jouard et al.

(10) Patent No.: US 11,639,033 B2
(45) Date of Patent: May 2, 2023

(54) METHOD FOR MANUFACTURING A THREE-DIMENSIONAL ARTICLE BY AN ADDITIVE MANUFACTURING TECHNOLOGY

(71) Applicant: Essilor International, Charenton-le-Pont (FR)

(72) Inventors: Ludovic Jouard, Charenton-le-Pont (FR); Loïc Baillon, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 90 days.

(21) Appl. No.: 16/612,312

(22) PCT Filed: May 9, 2018

(86) PCT No.: PCT/EP2018/062142
§ 371 (c)(1),
(2) Date: Nov. 8, 2019

(87) PCT Pub. No.: WO2018/206724
PCT Pub. Date: Nov. 15, 2018

(65) Prior Publication Data
US 2020/0164591 A1    May 28, 2020

(30) Foreign Application Priority Data
May 11, 2017   (EP) .................................... 17170718

(51) Int. Cl.
*B29C 64/40* (2017.01)
*B29C 64/124* (2017.01)
(Continued)

(52) U.S. Cl.
CPC ............ *B29C 64/40* (2017.08); *B29C 64/124* (2017.08); *B29C 64/153* (2017.08); *G02C 5/008* (2013.01);
(Continued)

(58) Field of Classification Search
CPC ......... B33Y 80/00; B33Y 70/00; B33Y 10/00; G02C 5/008; B29C 64/153; B29C 64/124; B29C 64/40
See application file for complete search history.

(56) References Cited

U.S. PATENT DOCUMENTS

2018/0129075 A1\* 5/2018 Zewe ..................... B29D 12/02
2018/0154437 A1\* 6/2018 Mark ......................... B22F 1/10
2020/0156154 A1\* 5/2020 Chehab ................. C22C 1/0416

FOREIGN PATENT DOCUMENTS

EP    2526141 A1 \* 11/2012 ................ C08J 7/04
EP    2526141 A1    11/2012
(Continued)

OTHER PUBLICATIONS

Machine translation of EP 2526141.\*
(Continued)

*Primary Examiner* — Larry W Thrower
(74) *Attorney, Agent, or Firm* — Nixon & Vanderhye

(57) ABSTRACT

Disclosed is a method for manufacturing a three-dimensional article, including: a step of producing the article by an additive manufacturing technology, the article including at least two parts that face, at least partially, each other or that have edges facing, at least partially, each other; and a step of finishing the article. According to the invention, the two parts are produced together with a temporary connection that links the two parts, and the method includes, after the step of finishing, a step of unlinking the temporary connection in order to separate the two parts.

11 Claims, 2 Drawing Sheets

(51) Int. Cl.
    *B29C 64/153*     (2017.01)
    *G02C 5/00*     (2006.01)
    *B33Y 10/00*     (2015.01)
    *B33Y 70/00*     (2020.01)
    *B33Y 80/00*     (2015.01)

(52) U.S. Cl.
    CPC ............... *B33Y 10/00* (2014.12); *B33Y 70/00* (2014.12); *B33Y 80/00* (2014.12)

(56) References Cited

FOREIGN PATENT DOCUMENTS

| KR | 20170014619 A | 2/2017 | | |
|---|---|---|---|---|
| WO | 2011089208 A1 | 7/2011 | | |
| WO | WO-2011089208 A1 * | 7/2011 | ................ | C08J 7/02 |
| WO | 2017071762 A1 | 5/2017 | | |

OTHER PUBLICATIONS

Machine translation of WO 2011/089208.*
International Search Report (ISR), dated Aug. 7, 2018, from corresponding international application No. PCT/EP2018/062142.

* cited by examiner

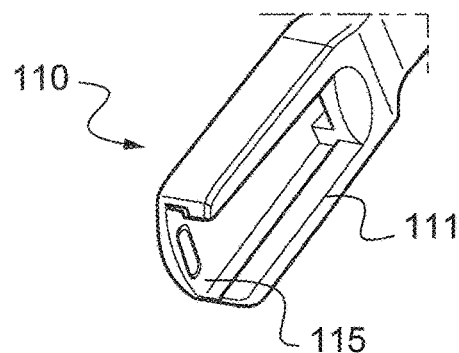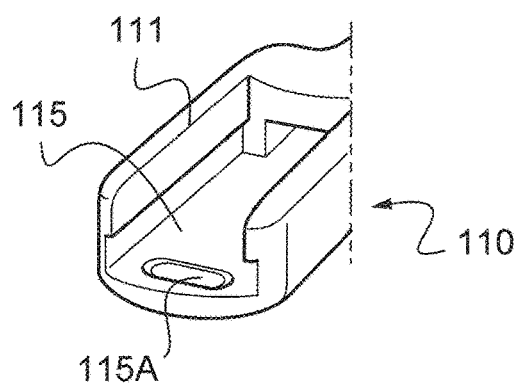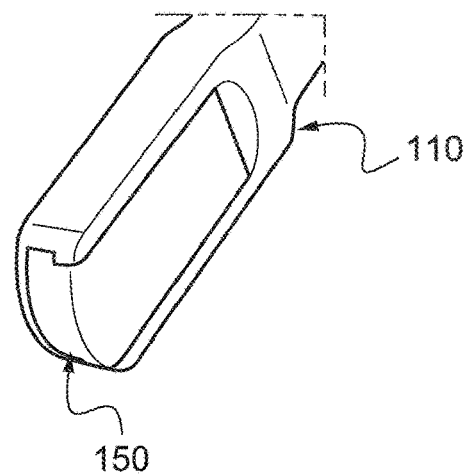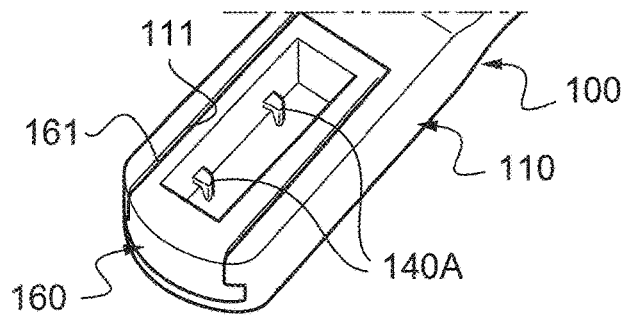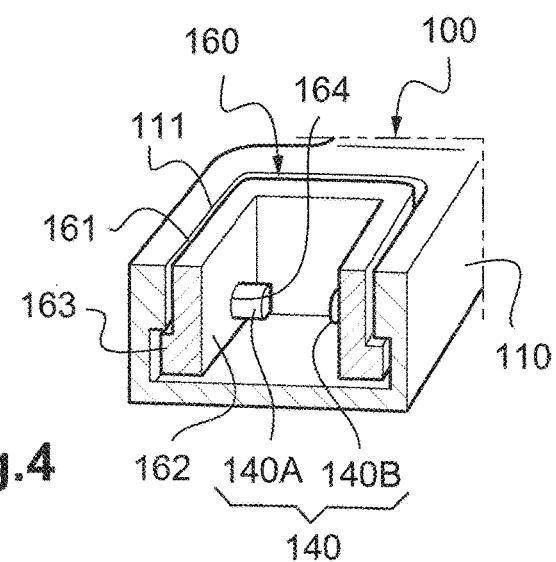

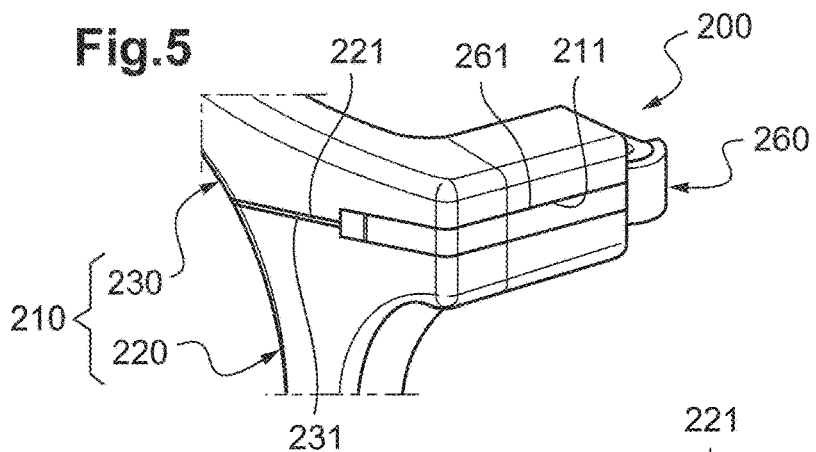
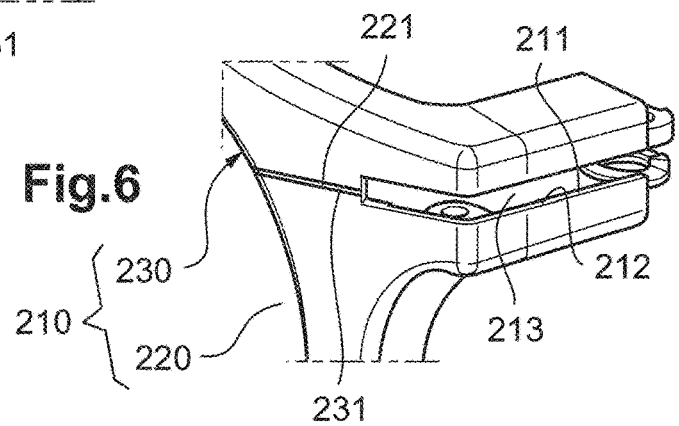
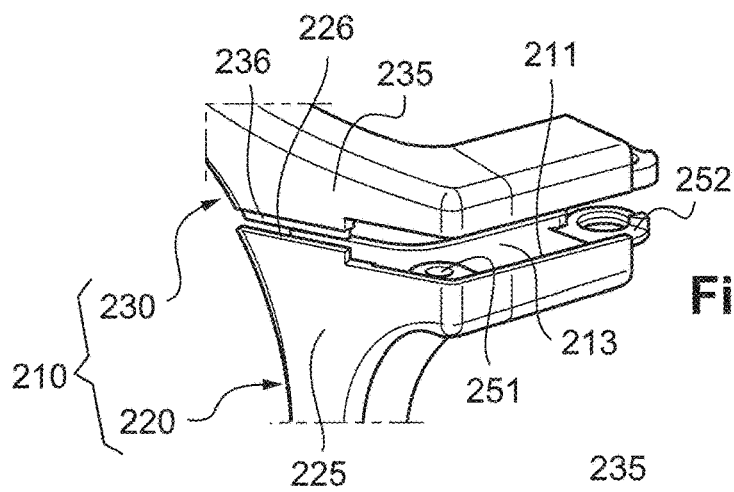
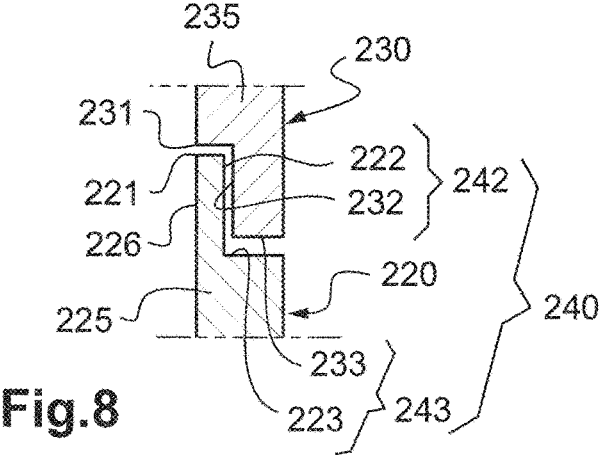

METHOD FOR MANUFACTURING A THREE-DIMENSIONAL ARTICLE BY AN ADDITIVE MANUFACTURING TECHNOLOGY

TECHNICAL FIELD TO WHICH THE INVENTION RELATES

The present invention relates in general to the manufacturing of three-dimensional articles by an additive manufacturing technology.

The invention applies more particularly to the manufacturing of eyeglass pieces.

The invention relates to a method for manufacturing a three-dimensional article, comprising:
- a step of producing said article by an additive manufacturing technology, said article comprising at least two parts having surfaces that face, at least partially, each other or having edges that face, at least partially, each other, and
- a step of finishing said article.

The invention also relates to a three-dimensional article produced by an additive manufacturing technology, comprising:
- at least two parts having surfaces that face, at least partially, each other or having edges that face, at least partially, each other, and
- a temporary connection that links said two parts.

TECHNOLOGICAL BACKGROUND

There are many methods for manufacturing articles.

In the domain of eyeglasses, the main method for manufacturing a plastic piece of frame is the injection molding.

In the recent years, the launch of 3D printers caused a change in the manufacturing of eyeglass articles: the manufacturers have started to manufacture these articles thanks to different additive technologies.

Document EP2526141 discloses an example of application of such a technology to the manufacturing of an eyeglass article.

The major drawback of such a technology is that the obtained articles do not have a good surface quality. Because eyewear articles require high quality surface aspects, a step of finishing is thus required.

An example of cost effective finishing process is the finishing by "vibratory bowl". It consists in putting the obtained articles in a bowl with wood pieces, and in rotating the bowl so that the wood pieces polish the external surfaces of the articles.

It is well known that this kind of finishing method tends to round the sharp edges of the eyeglass articles, which can create many problems (aesthetic problems, problems of fixation of the articles relative to other eyeglass articles, problems of guiding the articles relative to other eyeglass articles . . . ).

OBJECT OF THE INVENTION

The object of the present invention consists in preserving the sharp edges of articles manufactured by additive technologies.

According to the invention, the two parts of the article defined in introduction are produced together with a temporary connection, said temporary connection linking said two parts and said temporary connection comprising an inhomogeneity along said surfaces or said edges, and the method defined in introduction comprises, after said step of finishing, a step of unlinking said temporary connection in order to separate said two parts.

The inhomogeneity has a pre-cut function, enabling to separate the surfaces or the edges.

Thus, according to the invention, one of the two parts can be used to protect the other part during the step of finishing.

For instance, one of the two parts can have a mask function. In this example, the mask is created and positioned in front of the other part during the step of manufacturing the article, so that its manufacturing and positioning require no tool and no manual operation. Thus, this mask does not involve any extra cost. Moreover, the mask can present a complex shape to protect a complex edge of the other part (that could hardly be masked with an external mask).

In another example, the two parts can protect themselves. It is thus possible to obtain two parts that have perfect shapes to mate each other (these parts being able to create for instance the hinge of a temple with a rim of an eyeglass frame).

Other non-limited characteristics of the instant invention are the following ones:
- said temporary connection is breakable with a force lower than the force necessary to break any other part of said article;
- said inhomogeneity comprises an inhomogeneity of presence of material along said surfaces or said edges;
- said temporary connection comprises at least one breakable point or line or pin that links said two parts;
- said temporary connection comprises at least one breakable surface of contact that links said two parts;
- said additive manufacturing technology comprising an operation of fusion of powder or of solidification of fluid, said inhomogeneity comprises an inhomogeneity of fusion of powder or solidification of fluid along said surfaces;
- said temporary connection is the result of an imperfect fusion of powder or solidification of fluid in said breakable surface of contact;
- said inhomogeneity comprises an inhomogeneity of material along said surfaces or said edges;
- said temporary connection is made of a material that is soluble in a liquid and wherein said two parts are made of a material that is not soluble in said liquid;
- one of said two parts is a mask entirely separable from the other part;
- said mask is situated in a groove recessed in an external surface of said other part and wherein said mask protrudes from said external surface;
- said two parts are also connected to each other by a definitive connection so that these two parts form a single piece even when said temporary connection is disconnected;
- each part comprises a main body adjacent to the main body of the other part, one of the two parts also comprises a rabbet that covers a portion of the main body of the other part, and said temporary connection is situated between said rabbet and the main body of the other part;
- at least one of said two parts defines a housing for an electronic device;
- at least one of said two parts forms a piece of eyeglass frame;
- said step of finishing comprises a mechanical polishing of said article, for instance a tribofinishing of said article.

The invention also relates to a three-dimensional article produced by an additive manufacturing technology, comprising at least two parts that face (at least partially) each other or that have edges facing (at least partially) each other, and a temporary connection that links said two parts, said two parts and said temporary connection being designed so that the temporary connection preserves at least one of the two parts or one of the edges during a step of finishing of said article.

Preferably, one of said at least two parts forms a portion of a spectacle temple having a recess, the other of said at least two parts being temporarily mounted in the recess.

DETAILED DESCRIPTION OF AN EMBODIMENT

The following description with reference to the accompanying drawings, given by way of non-limiting example makes it clear what the invention consists in and how it can be reduced to practice.

In the accompanying drawings:

FIGS. 1A and 1B are perspective schematic views of a first part of an eyeglass frame temple, seen from two points of view, FIG. 2 is a perspective schematic view of the first part represented in FIG. 1 and of an electronic part fitted in this first part, FIG. 3 is a perspective schematic view of the first part represented in FIG. 1 and of the mask manufactured together with this first part, FIG. 4 is a sectional view of the first part and of the mask represented in FIG. 3, FIG. 5 is a perspective schematic view of a second part of an eyeglass frame and of the mask manufactured together with this second part, FIG. 6 is a perspective schematic view of the second part represented in FIG. 5, when the mask has been removed, FIG. 7 is a perspective schematic view of the second part represented in FIG. 6, when the second part has been cut in two portions, and FIG. 8 is a sectional view of the second part represented in FIG. 6.

The present invention relates to the manufacturing of articles by an additive technology, for instance by means of a 3D printer.

In the following description, the considered articles will be parts of eyeglass frames but the invention is not limited to such parts.

Classically, a pair of eyeglasses comprises a frame and a pair of lenses.

Here, we will consider that this pair of eyeglasses is of the rimed type. Consequently, its frame comprises a main portion with two rims attached together by a bridge, and two temples attached to the main portion by two hinges.

Each lens may be a lens without any correction effect (for instance a lens for sunglasses) or a corrective lens (for instance, an unifocal or bifocal or trifocal or progressive lens).

Here, we will consider that the pair of eyeglasses has an electronical function. To this end, the frame is designed in order to house electronic components (battery, printed circuit board . . . ).

More specifically, as shown in FIGS. 1A, 1B and 2, one of the temples 110 comprises a recess 115 that have a substantially parallelepiped shape.

On FIG. 2, an electronic device 150 housed in this recess 115 is shown. This electronic device 150 completely fills the recess 115.

The recess 115 is situated at one end of the temple 110 and it outwardly opens at the end of this temple and on a side face of this temple. This end of the temple is situated at the opposite end of the temple end which is fastened to the hinge.

The temple 110 has a transversal section at the recess 115 which presents a dovetail shape, so that the electronic device 150 can be engaged into this recess 115 by a sliding movement, from the end of the temple toward the hinge.

As shown in FIG. 1B, one of the faces of the recess 115 comprises a notch 115A for the snap-fastening of the electronic device 150 into the recess 115.

Because the shape of the remain of the temple 110 is classic, it will not be described hereafter.

In FIGS. 5 to 7, a corner of the main portion 210 of the frame is represented. Because the shape of the remain of the main portion 210 is classic, it will not be described hereafter.

Each upper corner of the main portion 210 of the frame has a particular shape, enabling the mounting of the ophthalmic lenses in the rims defined by this main portion 210 and the fastening of the hinges.

In this example, each upper corner of the main portion 210 comprises two parts 220, 230 that face each other and that belong to a single piece (these parts are attached together by the rim).

In FIG. 7, these two parts 220, 230 are represented at a distance from each other, which enables the mounting of the ophthalmic lens into the rim. But these two parts 220, 230 are designed to mate each other in order to block the ophthalmic lens into the rim.

In this figure, it can be seen that each part defines two circular holes 251, 252 that are designed to house two axes of the corresponding hinge. One of the two circular holes 252 is provided in a washer that extends at an extremity of the remainder of the corresponding part 220, 230 of the frame main portion.

The hinge is not shown in the figures because it does not make the focus of the invention. We will only specify that it comprises, in addition to the axes, a main body that is designed to mesh sandwiched between the two parts 220, 230.

Hereafter, we will consider that the temples 110 and the main portion 210 of the frame are all manufactured thanks to an additive technology.

Additive technology is a way to manufacture three-dimensional articles (the other methods consisting in removing material from an initial big block or in molding some material).

In the following, we will consider that this technology is implemented thanks to a 3D printer. Because such a 3D printer is already known, it will not be described here.

We will only specify that this 3D printer manufactures the articles thanks to any one of the following methods:

Stereolithography "SLA" (in which layers are created by curing photopolymers with UV lasers), Fused Deposition Modeling "FDM" (which works by extruding a thermoplastic polymer through a heated nozzle and by depositing it on a build stage), Selective Laser Sintering "SLS" (in which a powder is swept upon a build stage, a laser then selectively scans the thin layer of powder to sinter together powder particles, the build platform is then lowered one layer depth and the recoater applies a new coat of powder), Photopolymer jetting (in which inkjet print heads are used to jet liquid photopolymers onto a build platform, and in which the material is immediately cured by UV lamps and solidified which allows to build layers on top of each other).

In the following, we will consider that the 3D printer operates thanks to a SLS technology, by laser sintering of polyamide powder PA12, in successive layers of 60 micrometers.

As it will be explained in more details hereafter, each printed article 100, 200 is manufactured with two parts and with a temporary connection that links said two parts.

The articles obtained by such a 3D printer do not have a good surface quality. Consequently, a step of finishing is required. This step of finishing can consist in polishing the external faces of the printed articles 100, 200.

This finishing step can be implemented in different ways, automatically or manually, for instance by mechanical polishing, by grinding or by sand blasting.

In the following, we will consider that the step of finishing is implemented by tribofinishing, thanks to a vibratory bowl. This well known method consists in putting the printed articles 100, 200 in a vibrator bowl and in mixing them with abrasives (for instance wood pieces).

This step is followed by a last step of unlinking said temporary connection in order to separate said two parts.

The interest of manufacturing each article 100, 200 with two parts linked together by a temporary connection is to protect some of the sharp edges of the temples 110 and of the frame main portion 210 during the finishing step.

Indeed, the temples 110 and the main portion 210 of the frame need to present sharp edges, in particular for aesthetical and mechanical purposes. Manufacturing the articles in two parts enables one of these parts to protect the sharp edges of the other part. To this end, the first part needs to be situated in front of the sharp edges of the other part to be protected.

To explain in more details how the invention works, we will consider two different embodiments.

In a first embodiment shown in FIGS. 1A to 4, one of the parts is an eyewear piece (here a temple) and the other part is a mask entirely separable from the eyewear piece.

In a second embodiment shown in FIGS. 5 to 8, the said two parts belong to the same portion (here the main portion), each part having a sharp edge protected by the sharp edge of the other part. In this second embodiment, we will also consider a third part: a mask linked to the two first parts by temporary connections.

As shown in FIGS. 3 and 4, the article 100 manufactured by the 3D printer comprises the temple 110 and a mask 160 linked together by a temporary connection 140.

The mask 160 is situated where sharp edges of the temple 110 need to be protected.

In this embodiment, the need is to keep a nominal clearance between the electronic device 150 and the recess 115 (to ensure a good sliding and a good blocking of these two elements relative to each other).

As shown in FIG. 1B, the sharp edges 111 that need to be protected are thus the external edges of the recess 115.

Consequently, as shown in FIGS. 3 and 4, the mask 160 is printed together with the temple 110, during a single operation, so that it presents protection edges 161 that face the sharp edges 111 of the recess 115 to be protected.

The verb "face" means that the protection edges 161 of the mask 160 are situated along the sharp edges 111 to be protected, at a distance less than 1 millimeter. Moreover, the mask 160 is situated so that its external face (the one defining the protection edges 161) extends in continuation of an external face of the temple 110 (the one defining the sharp edges 111) or projects outward from this external face.

Here, the mask 160 and the temple 110 are printed in the same material but in a variant, different materials could be employed.

In this embodiment, as shown in FIG. 4, the mask 160 has a picture-frame shape (with a lateral wall 162 and two ridges 163 that border at the rear the external face of the lateral wall 162 in order to enable the sliding of the mask 160 out of the recess 115).

In the figures, the temporary connection 140 between the mask 160 and the temple 110 comprises an inhomogeneity of presence of material. In other words, the mask 160 and the temple 110 are not linked together by a uniform surface or by a uniform edge. On the contrary, they are linked by a matrix of linking points or pins.

In this embodiment, the temporary connection 140 comprises 4 brittle pins 140A, 140B printed together with the mask 160 and the temple 110.

Each pin 140A, 140B extends from an internal lateral face of the recess 115 toward the opposite internal lateral face, through an opening 164 provided in the lateral wall 162 of the mask 160. These pins 140A, 140B are manufactured so that they do not touch the edges of these openings 164.

These pins 140A, 140B can be broken by hand or cut with a knife after the finishing step, so that the mask 160 can be extracted from the recess 115, by a sliding movement.

The pins 140A, 140B are breakable with a force lower than the force required to break any other part of the printed article 100.

We note that before breaking these pins 140A, 140B, it is possible to paint or to varnish the article 100, so that the mask 160 prevents the internal faces of the recess 115 to be coated.

In a variant, the mask could be attached to the frame thanks to another kind of temporary connection.

To illustrate this variant, FIG. 5 represents a mask 260 that is situated in the housing 213 of the main body of the hinge, in order to protect the sharp edges 211 of this housing 213 and the washers in which the circular holes 252 are provided.

In this variant, the mask is not linked to the main portion 210 of the frame by pins.

On the contrary, it is linked by a series of breakable points that extend between the mask 260 and each part 220, 230 of the main portion 210. These breakable points are manufactured together with the mask 260 and the main portion. They have a diameter lower than 0.5 millimeter in order to be easy to break, and a height lower than 0.1 millimeter.

These breakable points are distributed along the edges of the hinge housing 213, in none-functional and/or invisible areas. For instance, there is no breakable point on the washers to prevent any problem of mounting the axes of the hinge in the circular holes 252 or any aesthetical problem.

In a variant, the mask 260 could be linked to each part 220, 230 of the main portion 210 of the frame by a breakable line extending along the edges of the hinge housing 213. Such a breakable line could have a width lower than 0.3 millimeter in order to be easy to break, and a height lower than 0.1 millimeter.

In another variant, the mask 260 could be linked to each part 220, 230 of the main portion 210 of the frame by a breakable surface of contact.

To describe in more details this variant, we need to outline some of the characteristics of each part 220, 230 of the main portion 210.

Each of these parts 220, 230 has a half-shell shape, with an end-edge 212 that faces the end-edge 212 of the other part (said end-edge 212 having a ridge that defines the said sharp edge 211 as shown in FIG. 6).

The end-edge of each part 220, 230 defines a surface herein called "surface of contact 212" because it is manufactured in contact with a corresponding surface of the mask 260.

In other words, the hinge housing 213 is defined between two opposite surfaces of contact 212, and the mask 260 is manufactured between these two opposite surfaces of contact 121, stick therebetween.

This sticky effect is obtained during the manufacturing of the mask 260 together with the parts 220, 230.

The idea is to create a weak and pre-cut surface that will be easy to break after the polishing step.

To this end, the additive manufacturing technology comprising a powder fusion operation, said weak surface of contact is the result of an imperfect fusion of the powder.

In a variant in which the additive manufacturing technology would comprise a fluid solidification operation, said weak surface of contact would be the result of an imperfect solidification of the fluid.

In other words, the weak surface of contact is obtained by an inhomogeneity in the fusion of powder or in the solidification of fluid.

Here, to obtain an imperfect fusion of powder, different solutions can be employed. A first solution could consist in decreasing the power of the laser when generating these surfaces of contact. Another solution could consist in designing the article with the surfaces of contact of the parts 220, 230 very close to the mask 260 (but at a distance from it), in order to profit from the lack of accuracy of the 3D printer.

The distance (between two layers of material or between two fusion of solidification points) is adjusted in order to create a link solid enough to resist during the finishing step, and weak enough to be manually broken.

This distance is defined as the threshold of distance to get a fusion or a solidification in the process of additive manufacturing technology.

In FIGS. 5 to 8, the two parts 220, 230 of the article 200 (which is manufactured in one piece) are linked together not only via the mask 260 but also directly.

As explained above, these two parts 220, 230 belong to a single piece (the main portion 210) and they are designed to mate each other in order to block an ophthalmic lens in the corresponding rim.

As shown in FIGS. 7 and 8, each of the two parts 220, 230 comprises a main body 225, 235 that has a half-shell shape and that forms a portion of the rim and a portion of the hinge holder.

The main bodies 225, 235 of these two parts 220, 230 are adjacent to each other in the sense that they have adjacent edges 221, 231 that are designed to come into contact with each other and to interlock. Here, these adjacent edges 221, 231 extend from the hinge housing 213 to the opening defined by the corresponding rim.

These adjacent edges 221, 231 should match together but not be fastened to enable the mounting and the dismounting of the lens from the rim frame.

A purpose of this matching is to hide at best the line of connection between these two parts 220, 230 on the front face of the main portion of the frame, when the lens is mounted into the rim.

To this end, as shown in FIGS. 7 and 8, one of the two parts 220 comprises a rabbet 226 that projects from the main body 225 of this part and that covers a portion of the main body 235 of the other part 230. Here, this rabbet 226 is designed to engage into a groove 236 provided in correspondence in the main body 235 of said other part 230.

One of the adjacent edges 221 lies along the rabbet 226 and the other adjacent edge 231 lies along the groove 236.

A purpose of the invention is to preserve the adjacent edge 221 of this rabbet 226 and the corresponding adjacent edge 231 of the groove 236 to ensure a perfect junction between these edges after the polishing step.

To achieve this purpose, the rear face 222 of the rabbet 231 and the front face 232 of the groove 236 are linked to each other by a first temporary connection 242.

Here, the lateral faces 223, 233 of the main bodies 225, 235 are also linked to each other by a second temporary connection 243.

The first and second temporary connections 242, 243 form a global temporary connection 240 that links the two parts 220, 230 of the main portion 210 of the frame and that is manually breakable.

Here, the used temporary connection is of the type "breakable surface", as described above.

To ensure the connection of the faces 222, 223, 232, 233 of the two parts 220, 230 and the possible breaking of this connection, these two parts 220, 230 are designed to be manufactured so that:
  the distance between the rear face 222 of the rabbet 231 and the front face 232 of the groove 236 is equal to 0.1 millimeter, and
  the distance between the lateral faces 223, 233 of the main bodies 225, 235 is equal to 0.2 millimeter.

Hence, during the finishing step, the global temporary connection 240 resists the efforts exerted by the abrasives. Moreover, once the finishing step has been completed, it is possible to break this global temporary connection 240 manually and easily, with a reduced force, which avoids the breaking of the remainder of the main portion. Indeed, the remainder of the main portion is much more solid that this temporary connection, that is why it can be told that the two parts 220, 230 are linked together by a "definitive connection" around the rim, and by a global "temporary connection" 240 in the corner of the main portion.

The instant invention is not limited to the embodiments described above.

For instance, other types of temporary connections could be imagined. For example, it could be possible to use, between the contact surfaces of the two parts, a material that links these surfaces and that is soluble in a liquid (when the two parts are made of a material that is not soluble in said liquid under the same temperature and pressure conditions). In this example, the inhomogeneity of material along the surfaces (the material of the surfaces is distinct from the sandwiched soluble material) enables an easy breaking of the temporary connection.

In another example, the mask could be printed in a material less rigid that the one of the temple (for instance in an elastomeric material) so that it can be easily removed from the temple, without breaking any pin.

In another example, provision could be made for the mask to not be discarded after the step of breaking the temporary connection. For instance, the mask could be employed as a cover to close the recess provided in one of the temples of the frame.

The invention claimed is:
1. A method for manufacturing a three-dimensional article, the method comprising:

producing said article by an additive manufacturing technology, said article comprising at least two parts having surfaces that at least partially face each other or edges that at least partially face each other, the additive manufacturing technology comprising fusion of powder or solidification of fluid, said two parts being produced together with a temporary connection, said temporary connection linking said two parts, said temporary connection comprising an inhomogeneity of a presence of material along said surfaces or said edges, the inhomogeneity of the presence of material comprises an inhomogeneity of fusion of powder by a laser or an inhomogeneity of solidification of fluid along said surfaces or said edges;

finishing the article; and unlinking said temporary connection in order to separate said two parts after the finishing the article, wherein said inhomogeneity of fusion of powder is obtained by decreasing a power of the laser from a first power during the producing the article to a second power lower than the first power to obtain the inhomogeneity or by designing the article with said surfaces of the two parts at a distance in a range from 0.1 millimeters to 0.2 millimeters from each other, said distance being adjusted to generate said inhomogeneity of fusion of powder, all of each of the surfaces of the two parts are at the distance from each other, and the surfaces of the two parts facing each other complement one another.

2. The method according to claim 1, wherein said temporary connection is breakable with a force lower than the force necessary to break any other part of said article.

3. The method according to claim 1, wherein said temporary connection is made of a material that is soluble in a liquid, and wherein said two parts are made of a material that is not soluble in said liquid.

4. The method according to claim 1, wherein one of said two parts is a mask entirely separable from the other part.

5. The method according to claim 4, wherein said mask is situated in a groove recessed in an external surface of said other part, and wherein said mask protrudes from said external surface.

6. The method according to claim 1, wherein said two parts are further connected to each other by a definitive connection so that the two parts form a single piece even when said temporary connection is disconnected.

7. The method according to claim 1, wherein:

each part comprises a main body adjacent to the main body of the other part, one of the two parts further comprises a rabbet that covers a portion of the main body of the other part, and said temporary connection is situated between said rabbet and the main body of the other part.

8. The method according to claim 1, wherein at least one of said two parts defines a housing for an electronic device.

9. The method according to claim 1, wherein at least one of said two parts forms a piece of an eyeglass frame.

10. The method according to claim 1, wherein said finishing comprises mechanically polishing said article.

11. The method according to claim 10, wherein the mechanically polishing the article comprises tribofinishing the article.

* * * * *